United States Patent

Halm, III

[15] 3,693,778

[45] Sept. 26, 1972

[54] ASSEMBLY FOR USE WITH CONVEYOR SYSTEM FOR SEPARATING AND DIVERTING OBJECTS

[72] Inventor: Frank J. Halm, III, South Windsor, Conn.

[73] Assignee: Kaman Aerospace Corporation, Bloomfield, Conn.

[22] Filed: Dec. 30, 1970

[21] Appl. No.: 102,872

[52] U.S. Cl.................................................198/29
[51] Int. Cl............................................B65g 47/22
[58] Field of Search........198/29, 30, 66, 34; 23/154, 23/124

[56] References Cited

UNITED STATES PATENTS

| 1,681,863 | 8/1928 | Lahr | 198/30 |
|---|---|---|---|
| 2,642,173 | 6/1953 | Wehmiller | 198/30 |
| 2,743,807 | 5/1956 | McKune | 198/30 |
| 2,920,738 | 1/1960 | Carter | 198/30 |

FOREIGN PATENTS OR APPLICATIONS

| 64,065 | 10/1945 | Denmark | 198/30 |

*Primary Examiner*—Richard E. Aegerter
*Attorney*—Cushman, Darby & Cushman

[57] ABSTRACT

A guiding frame assembly is provided with a series of gates for receiving and diverting individual objects moving along a conveyor system. The frame assembly is constructed to be mounted over existing conveyor equipment without modification of the conveyor equipment, and the series of gates are progressively staggered from an upstream area to a downstream area of the conveyor system so as to intercept and receive objects from a desired width of the conveyor system. The gates are of special design to handle a variety of shapes and sizes of objects.

5 Claims, 6 Drawing Figures

INVENTOR
FRANK J. HALM III

ASSEMBLY FOR USE WITH CONVEYOR SYSTEM FOR SEPARATING AND DIVERTING OBJECTS

BACKGROUND AND BRIEF DESCRIPTION OF INVENTION

It is known to provide for conveying and handling means for perfectly smooth and regular objects, such as bottles, with equipment which includes a plurality of mouths or openings positioned across the width of a conveyor to intercept such objects and to divert them from their normal paths of movement. An example of such equipment is shown in U.S. Pat. No. 860,936. However, it is desirable to provide for similar handling of irregular shaped objects or for an assortment of shapes and sizes of objects which may be handled from time to time with the same conveyor equipment, and known prior art systems have not satisfied such needs. The trend of the development of this art since the time of U.S. Pat. No. 860,936 appears to be one of providing for more complex equipment capable of matching a wider range of specific needs for specific objects to be handled. Such equipment may typically include multiple conveying devices, interrelated driving mechanisms, sensing equipment, and other assemblies necessary to interrelate movements and handling of whatever objects are being treated. An example of a more recent type of equipment is shown in U.S. Pat. No. 2,763,359. Other representative disclosures in this art include U.S. Pat. Nos. 1,326,903; 1,416,763; 1,923,752; 2,167,343; 2,215,702; 2,405,805 and 2,609,947.

In contrast to the apparent trend of the prior art, the present invention is directed to improvements of a type which provide for a very simple and reliable assembly which can be positioned over existing conveyor equipment to divert objects into a series of zones along one side of the conveyor equipment. However, even though the equipment of this invention is very simple in construction, it is capable of handling a range of sizes and shapes of objects, such as candies, which traditionally have required manual handling, or highly specialized equipment for handling, to prevent damage to the objects. More specifically, the invention is concerned with providing a guiding frame assembly which can be mounted over a conveyor belt system for separating and diverting individual candies into separate pickup zones where the candies are subsequently received and transferred to packaging equipment which is operated in conjunction with the separating and diverting equipment.

In accordance with a preferred embodiment of the invention a mass of individual candies is received from an enrober belt of a candy manufacturing machine onto a first conveyor for being separated and diverted into pickup zones along one side of the first conveyor means. An assembly is provided for guiding and aligning the individual candies into the pickup zones, and the assembly is in the form of a frame means which can be mounted over the first conveyor so as to intercept and divert the candies as they move from an upstream end towards a downstream end of the first conveyor. The frame means includes a series of gate means which are carried in a progressively staggered relationship along a length of the first conveyor so as to define a plurality of gate openings which receive candies from across a given width of the first conveyor. The gate means are arranged so that the most upstream gate means is located nearest the side of the first conveyor to which all candies are to be diverted, and the most downstream gate means is located furthermost away from the same side of the first conveyor. A guiding means, preferably in the form of a rotating post, is associated with each of the gate means for assisting in moving individual candies through the gate opening and into a single file row to a pickup zone near the side of the first conveyor. From there, the candies are transferred to a second conveyor means by transferring devices which can pick up a selected number of individual candies from each pickup zone and transfer them to packages or boxes on the second conveyor means. The complete frame assembly is manufactured from metal or plastic elements which can be easily shaped and mounted for adjustment on framing elements. The entire assembly is formed so that it can be positioned over existing conveyor belt equipment without modification of the conveyor belt itself.

Thus, there is provided a relatively simple, and yet reliable, system for handling and separating a mass of objects. The assembly can be adjusted to handle assorted sizes of candies, or irregular shapes in candies, and the entire framing assembly is modular in form so that two or more such framing assemblies can be aligned in series over conveyor equipment, if desired.

These and other features of the present invention will become apparent in the more detailed discussion which follows. In that discussion, reference will be made to the accompanying drawings as briefly described below.

DETAILED DESCRIPTION OF INVENTION

Although the following description will make specific reference to a preferred embodiment which is especially useful for handling masses of candy being moved from a candy manufacturing machine, it will be appreciated that the principles of the invention can be applied to the handling of other objects which must be separated or diverted from one direction of movement to another for purposes of segregating individual units from a mass of such objects.

Figure 1:
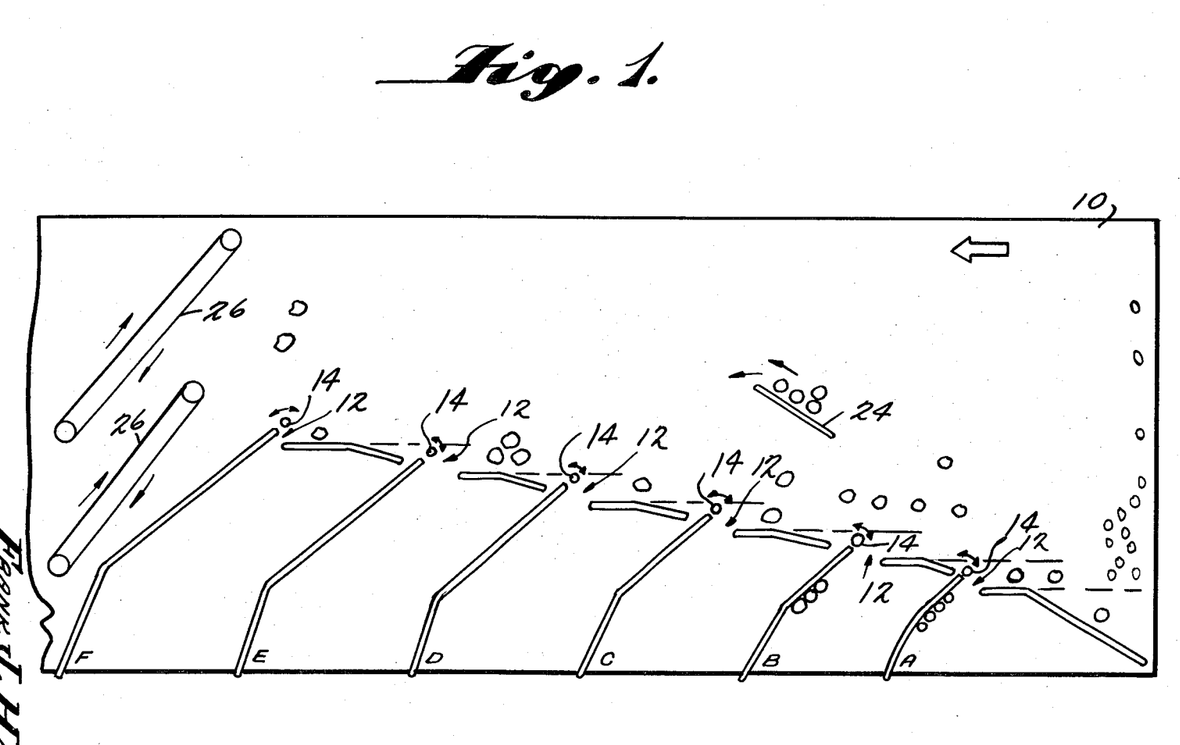
FIG. 1 is a top plan view showing functional relationships of elements associated with the assembly of this invention, as placed over a conveyor system which is moving a mass of objects in the general direction of the large arrow which appears in the drawing.

FIG. 1 illustrates a typical layout for guiding and diverting elements associated with the assembly of the present invention as arranged for handling a mass of candies being moved on a large endless belt conveyor 10 from a point of manufacture. The FIG. 1 view is intended to illustrate certain functional relationships of basic elements utilized with the assembly, and therefore, mounting details and other details of construction have been omitted from this view. The conveyor belt 10 is of known construction, and its upstream end is at the right-hand side of the FIG. 1 view. The downstream end of the conveyor belt 10 is not shown in FIG. 1, since the belt would be approximately twice as long as that shown in the FIG. 1 view. Thus, movement of the top surface of the endless belt conveyor 10 is in the direction of the large arrow appearing thereon. The mass of candies is received from an enrober belt of a standard candy manufacturing apparatus. A vibrator plate (not shown) may be provided as a bridge between the enrober belt and the upstream end of the endless conveyor belt 10 for assisting in transferring candies from one conveyor belt to the other. Once the mass of candies is on the conveyor belt 10, each individual candy will be moved initially in a straight path towards the downstream end of the conveyor (towards the left in the FIG. 1 view). However, not all candies of the mass continue in their initial directions of movement because the assembly of the present invention provides for a guiding and diverting of individual candies from the mass and from their initial paths of movement towards the downstream end of the conveyor. The purpose in guiding and diverting candies is to separate specified numbers of the candies into aligned positions in separate pickup zones, labelled A through F in the FIG. 1 view, where the candies can be picked up singly or in multiple numbers. Thus, the mass of candies is intercepted as it moves down the conveyor belt 10, and the separate pickup zones are maintained filled by the guiding and diverting action which takes place.

The assembly itself will be discussed in greater detail with reference to additional views and drawings, but FIG. 1 illustrates the basic relationships and movements involved with the assembly of this invention. As shown, a series of gate means 12 are positioned relative to the conveyor means 10 so as to define a plurality of openings for receiving one candy at a time through each gate means. The series of gate means are progressively staggered along a length of conveyor belt 10 so as to intercept candies from across a given width of the conveyor belt. In the illustrated arrangement, the assembly provides for a series of staggered gate means 12 which progressively extend across approximately one-half of the width of the conveyor belt 10. This represents a preferred arrangement for certain uses because only one-half of the conveyor belt 10 is utilized for orienting and transferring candies, while the remaining half can act as a reservoir and unobstructed carrier for maintaining a series of pickup zones filled. Also, the arrangement shown in FIG. 1 provides for placement of a second assembly, identical to the one illustrated, downstream from the one which is illustrated for receiving candies from the reservoir area of the conveyor belt 10. This permits the addition of as many pickup zones as may be desired while still providing for a sufficient mass movement of candies to maintain each zone in a filled condition. Once the pickup zones are filled, the candies can be transferred with automatic equipment to packages or conveyed or treated in any manner desired. However, the embodiment which will be described herein is intended for use in combination with known transferring equipment for picking up selected number of candies from each pickup zone and placing them in boxes or packages being moved on a second conveyor means moving in a direction of movement parallel to the direction of movement of the conveyor belt 10.

Each of the gate means 12 includes a pair of spaced guiding elements which define the opening through which candies must pass to be received into the respective pickup zones. An outer (as related to the side of the conveyor to which all candies are being diverted) guiding element of each gate means is of a special construction and function to assist in the movement of candies through the opening of the gate means. This outer guiding element 14 is preferably in the form of a post member which can be driven or rotated so as to function as a "kicker" device for assisting in the movement of candies through the openings of the gate means. The guiding element 14 also functions to apply a gentle turning force to irregular-shaped candies that may become jammed or wedged with the gate means or with other candies during separation of the candies from the mass carried on the conveyor belt. The guiding element 14 can be rotated in either direction, depending upon the shape and type of object being handled.

Figure 2:
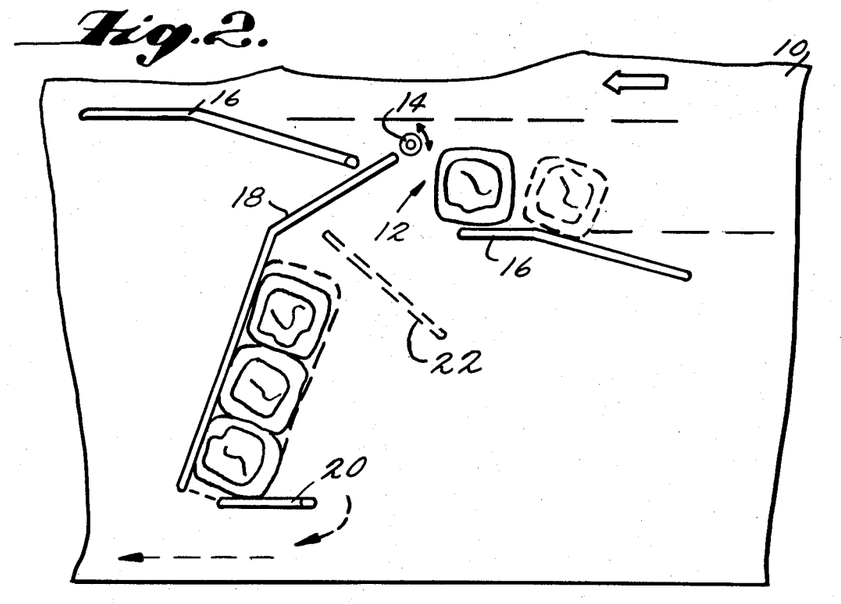
FIG. 2 is an enlarged top plan view of a single gate means associated with the layout shown in FIG. 1, and a number of individual candies are shown as being intercepted and diverted through the gate means and to a pickup zone.

As shown in both FIGS. 1 and 2, the outer guiding element 14 is also located slightly downstream from the end position of an inner guiding element 16. The opening of the gate means 12 is defined by the relative positions of the guiding elements 14 and 16, and these elements can be adjusted in accordance with arrangements which will be discussed later.

Once a candy has entered a gate means 12, it contacts a diverting means 18 which is carried just downstream of the gate means opening so as to guide and change the direction of movement of each candy as it passes through the gate means. The diverting means 18 is shaped to receive and guide individual candies towards one side of the conveyor belt 10. Because only one candy at a time can pass through each gate means, the individual candies are aligned in single file rows along the diverting means 18. As shown in both FIGS. 1 and 2, the diverting means 18 is shaped in such a way that candies continue along its full length, by the action of the conveyor belt 10 and the shape of the diverting means 18, until they are stopped at an end position by a stopping element 20. Preferably, the diverting means 18 is shaped, as illustrated, for providing a more rapid rate of lineal movement of each candy in the area of the gate means than in the area of the pickup zone. The candies may be guided to places at the very marginal edge of the conveyor belt 10 for subsequent treatment or transferring, or they may be stopped and aligned in positions which are spaced away from the marginal edge somewhat (see FIG. 2) so as to provide an escape zone, around each pickup zone, for candies that become dislodged out of the single file rows which are being established. In the FIG. 2 view, dashed line arrows are used to illustrate the path of movement of a dislodged candy around the stopping element 20 and into an escape zone along the marginal edge of the conveyor belt 10. Such candies will continue to a downstream position where they can be guided back into the main stream of candies being processed.

FIG. 2 also illustrates preferred relationships for guiding elements 16 for each subsequent gate means provided in a given arrangement. It can be seen that each guiding element 16 not only defines one edge of a gate means opening but also assists in guiding candies from an upstream position to the gate means which it is associated with. Thus, certain of the candies which are not received in one gate means will be pushed around the guiding element 14 of that gate means and subsequently received by a guiding element 16 of a next adjacent gate means downstream therefrom. This action continues for as many staggered position gate means as may be desired. Each guiding element 16 also includes a portion immediately adjacent to its associated gate means which is in substantial alignment with the direction of movement of the conveyor belt 10. This portion assists in aligning and orienting candies prior to entry into a gate means so that they will be received in a single file order and in a preferred orientation even though they may be of an oblong or irregular shape. FIG. 2 shows three individual candies aligned in a single file row in a pickup zone where they can be received by known equipment for being transferred to an adjacent conveyor or to other equipment. A dashed outline around the three candies indicates the position of a transferring device which will contact upper surfaces of the three candies and lift them out of the pickup zone. Of course, fewer or greater numbers of candies can be handled this way in accordance with specific equipment utilized. An optional hold-down element 22 is shown in FIG. 2 for preventing dislodgement or turning over of a next adjacent candy to those being lifted out of a pickup zone. Because of the lifting action itself, there is a possibility that any adjoining candy will be lifted slightly and turned over, but this is prevented by the hold-down element 22 positioned just above the upper surfaces of candies entering the pickup zone.

As shown in FIG. 1, the preferred arrangement provides for an orienting and separating of candies from across one-half of the width of the conveyor belt 10. This arrangement of elements is preferably constructed in the form of a modular frame which can be positioned over existing conveyor equipment without modification of the conveyor equipment. An identical modular frame can be positioned downstream therefrom to handle candies which bypass the series of gates shown in FIG. 1. In fact, it may be preferred in certain instances to provide a guiding vane 24 in the middle of an upstream portion of the conveyor to divert a portion of the mass of candies away from the first series of gate means 12 so that they can be handled by an identical series of gate means positioned downstream therefrom. Candies which are so diverted, or which miss the series of gates shown in FIG. 1, are shifted back to the orienting and guiding half of the conveyor by endless belt means 26, or any equivalent means, carried downstream from the first series of gate means.

Figure 3:
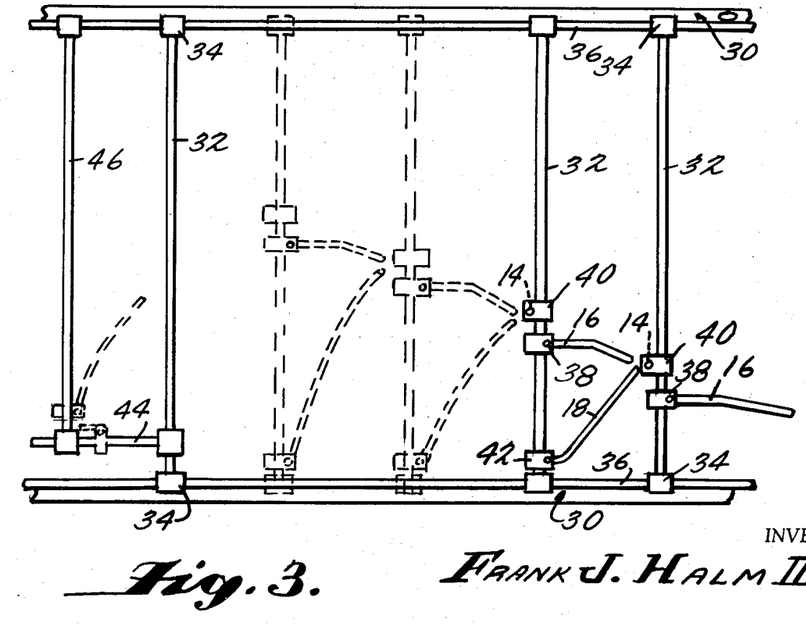
FIG. 3 is a top plan view, in substantially the same scale as that of FIG. 1, showing a portion of a frame assembly which can carry adjustable elements for defining positions and sizes of gate means of the type shown in FIGS. 1 and 2.

The arrangement shown in FIG. 1, with its progressive series of gate means for receiving candies from across one-half of the width of a conveyor belt means can be manufactured as a modular frame assembly so that two or more such assemblies can be utilized in a given application. Preferably, the modular frame assembly is of a type which can be secured and mounted over existing conveyor equipment so that no modification of the existing conveyor equipment is required. FIG. 3 illustrates a portion of a modular guiding frame assembly which can be constructed and adjusted to provide a series of gate means having preferred sizes of openings in preferred spaced positions over a conveying surface. Basically, the assembly includes two longitudinal framing members 30 which each include a horizontally disposed flange portion for being fastened to one side of conveyor equipment together with an upstanding flange portion 36 which can support a series of cross members 32 in preferred positions. The cross members 32 function to carry individual guiding elements 14 and 16, diverting means 18, and other elements associated with the guiding and orienting of objects on the conveyor surface. The various guiding and diverting elements may be formed from metal rod stock, plastic material or from metal wire coated with another material, such as polytetrafluoroethylene. The entire guiding frame assembly is mounted over a conveyor surface so that all guiding and diverting elements can depend downwardly in a way to intercept objects without interfering with the functioning of the conveyor equipment. The cross members 32 include mounting blocks 34 at their terminal ends for straddling the upstanding flange portions 36 of the framing members 30. Locking devices, such as screws or other fasteners, are provided in each of the mounting blocks 34 to fix the positions of the cross members 32 once preferred positions have been established. It can be seen that the cross members 32 can be adjusted longitudinally of the conveyor equipment to provide whatever spacing is needed between adjacent gate means. Each cross member 32 can carry one or more elements associated with the guiding and diverting of individual objects. These elements are carried from their own mounting blocks which can be adjusted along the length of whatever cross member 32 they are mounted on, to provide preferred positioning of each element over the conveyor surface. FIG. 3 illustrates typical mountings and spacings that can be established for guiding means 16 which depend from mounting blocks 38, rotating guiding elements 14 which are carried by mounting blocks 40 (means for driving the guiding elements 14 being omitted from the drawing for clarity), and diverting means 18 carried by a mounting block 42. Each of the mounting blocks 38, 40 and 42 is of a design to straddle or embrace a cross member 32 and includes a locking means for fixing its position once a preferred position has been established.

FIG. 3 also illustrates an alternative assembly arrangement which utilizes a longitudinally extending frame member 44 carried by two spaced apart cross members 32 (only one being shown) so as to define an escape zone area at the marginal edge of the conveying equipment. With this arrangement, a series of shorter cross members 46 are carried between one framing member 30 and the longitudinal framing member 44 for supporting guiding and diverting elements associated with a series of staggered gate means. Mountings of the guiding and diverting elements are similar to those discussed with reference to the other arrangements shown in FIG. 3.

Figure 4:
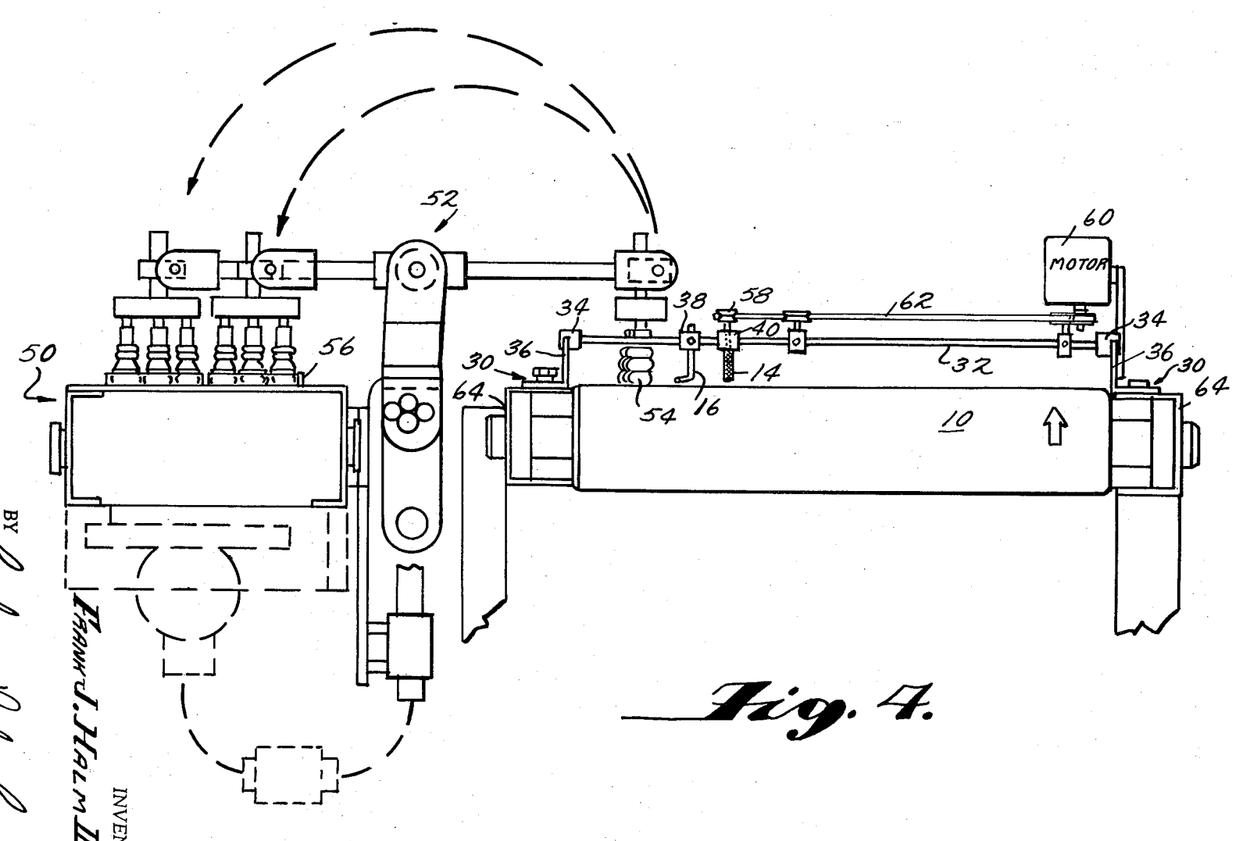
FIG. 4 is an elevational end view of a packaging system which includes a first conveyor belt, the assembly of this invention, and a second conveyor means for carrying packages into which candies are to be transferred from the first conveyor belt.

FIG. 4 is an end elevational view of the guiding frame assembly of the present invention mounted over an endless belt conveyor 10 which adjoins a parallel conveyor means 50 so that candies can be transferred from the conveyor means 10 into boxes or packages carried by the separate conveyor means 50. The separate conveyor means 50 may be of any known construction, such as an endless belt or a walking beam conveyor of the type disclosed in U.S. Pat. Nos. 3,456,424 and 3,499,262. Candies are transferred from the first conveyor to the second conveyor by a transferring means 52, also of a known construction (as shown for example in U.S. Pat. No. 3,456,424), which functions to pick up a selected number of candies with pickup heads 54 and to transfer them into packages or boxes 56 carried on the second conveyor means 50. As shown, the transferring means 52 can function to operate across the entire width of the second conveyor means 50. By arranging the first conveyor means and the second conveyor means 50 parallel to one another, it is possible to place selected numbers of candies into selected positions in each box or package as the box or package is moved along into positions opposite each of the pickup zones A–F of the first conveyor means 10. Known control and power devices are provided for operating the two conveyors and for correlating the movements of a series of transferring means 52 (corresponding to the number of pickup zones) with the movements of the conveyors. As shown in the end view of FIG. 4, the guiding element 14 may comprise a post carried by a shaft passing through the mounting block 40 for being positioned on a cross member 52. The shaft extends through the mounting block and carries a pulley means 58 driven by a motor 60 through an endless belt 62. A single motor 60 and endless belt 62 can function to drive all guiding elements 14 of a given modular guiding frame assembly. It can be seen that the assembly is mounted on framing structures 64 associated with a conventional endless belt conveyor 10. Other forms of conveying equipment may be utilized, if desired.

Figure 5:
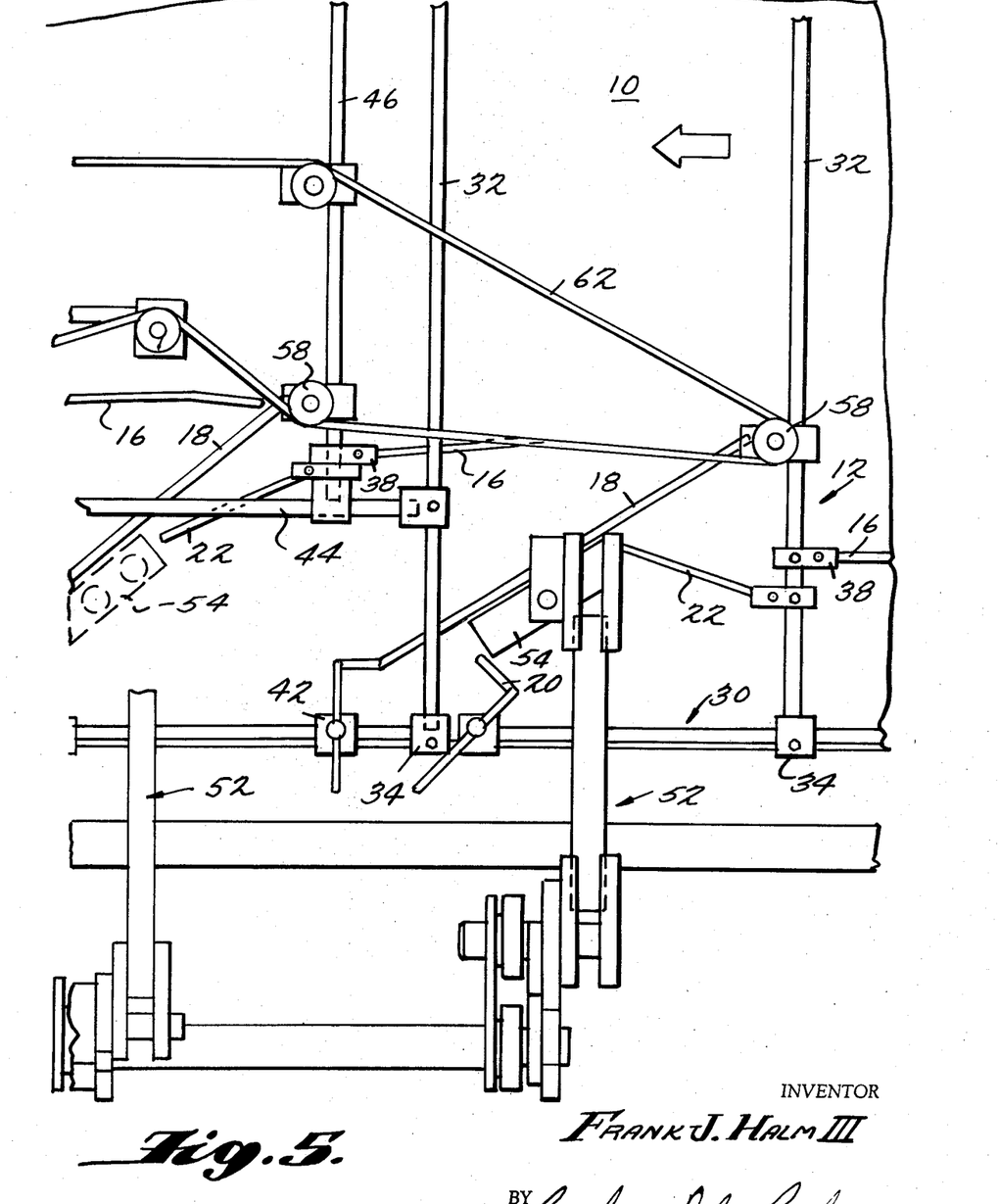
FIG. 5 is a top plan view, in enlarged scale, of a portion of a frame assembly and elements associated with a gate means at the upstream end of an assembly of the type contemplated by this invention.
Figure 6:
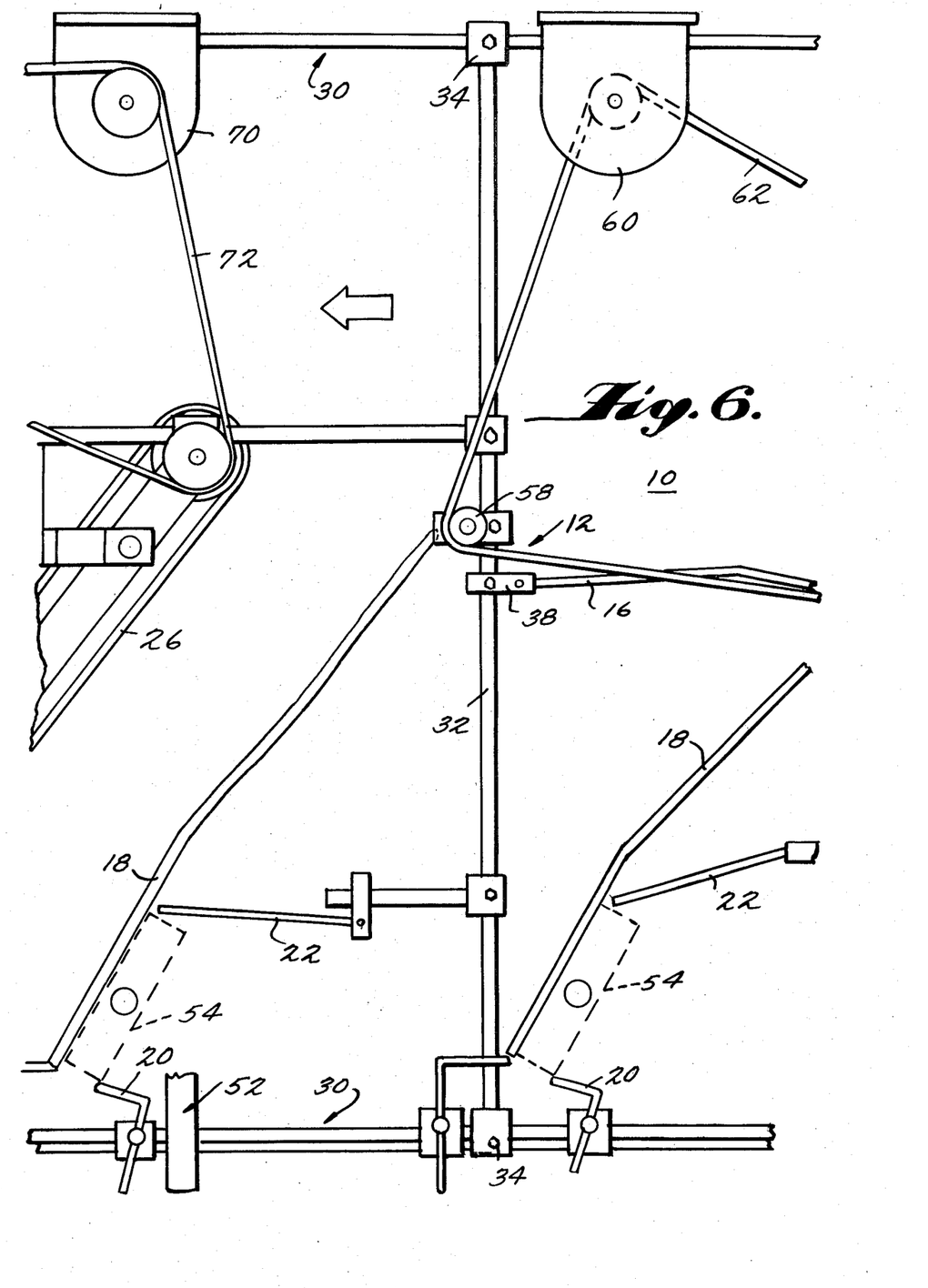
FIG. 6 is a top plan view, drawn in the same scale as FIG. 5, showing the structures associated with a gate means near a downstream end of the same assembly.

FIGS. 5 and 6 represent greatly enlarged top plan views of separate sections of a guiding frame assembly mounted over an endless conveyor belt 10. The FIG. 5 view represents details of structure associated with a first gate means 12 having a rotating guiding element 14 (not shown but carried by the shaft of a pulley 58). It can be seen that the endless belt 62 drives a plurality of pulley means (some of which are idler pulleys) which will be associated with downstream gate means of the series. FIG. 6 illustrates the downstream end of the same guiding frame assembly where a last gate means 12 is located. Also, FIG. 6 illustrates a separate motor means 70 with an endless belt 72 for driving the diverting belts 26 discussed with reference to FIG. 1 (only one such belt being shown in the FIG. 6 view). The FIG. 5 and 6 views represent mounting arrangements and elements that may be used in connection with the assembly of this invention to provide for desired sizes of gate openings and positions of pickup zones for alignment with transferring arm means 52 of adjoining equipment.

Having described the constructional and operational features of the present invention, it can be seen that an improved assembly is provided for handling a variety of shapes and sizes of objects to be separated and removed from a mass of such objects on a conveyor system. The assembly can be easily manufactured at low cost and can be installed on existing equipment without costly modification or change in operation of the existing equipment. Guiding and diverting elements associated with the assembly can be formed from various materials and in various ways. The use of metal rod stock has been illustrated in the embodiment discussed above, but fins, blades, or belts can be substituted as guiding and diverting elements for what has been illustrated and discussed. The preferred arrangement allows for a very efficient handling of large volumes of candies, or other objects, which must be moved to a number of pickup zones without causing a bottleneck or backlog of objects on the conveyor system. By utilizing only one-half of the width of a conveyor means for purposes of orienting and guiding objects to be separated from the mass, the remainder of the width functions as a large unobstructed reservoir for continuing the movement of a mass of objects away from a source. The conveyor means can be provided with variable speed drive which can be related to feeding and loading requirements of a particular application, and a sensing switch may be positioned at the last pickup zone to set the speed of operation of transferring and packaging equipment in accordance with the rate of filling of the last pickup zone.

Although a preferred embodiment of the invention has been described above, it will be appreciated that equivalent structures and relationships may be utilized in the practice of the invention.

What is claimed is:

1. A modular guiding frame assembly which can be mounted over a conveyor system, as a single unit or in combination with additional similar assemblies, for separating and diverting objects which are moving in a first direction along the conveyor system, comprising the combination of:

a series of two or more adjustable gate means which can be mounted over a conveyor system without interfering with the normal operation of the conveyor system, means for adjusting said gates, each gate means including guiding elements for defining an opening which is large enough to receive one object at a time as the object is being moved in said first direction by said conveyor system, and a diverting means carried just downstream of said opening to guide and change the direction of movement of each object that passes through the opening from said first direction of movement to a direction which carries the object to a collection zone where movement of the object is stopped until it can be removed or transferred from said conveyor system, and said series of gate means being arranged in progressively staggered positions extending across from an upstream end to a downstream end of the conveyor system so as to intercept and receive objects from a desired width of the conveyor system.

2. The assembly of claim 1 wherein the guiding elements of each gate means includes a rotating element at one side of the gate means opening for assisting in turning an object into the gate means for being diverted from its first direction of movement.

3. The assembly of claim 1 wherein said diverting means comprises a moving conveyor means.

4. The assembly of claim 1 wherein one of said guiding elements of said gate means is positioned upstream of the diverting means and approximately parallel to said first direction of movement for defining a collection path which will align said objects into a single row as they move to the opening of said gate means and to said collection zone.

5. The assembly of claim 1 wherein said combination of elements comprises a frame structure which includes means for being mounted over an existing conveyor belt system without modifying the conveyor belt system, and including adjusting means for adjusting the positions and sizes of said gate means to handle a range of shapes and sizes of objects.

* * * * *